United States Patent
Harkey et al.

(10) Patent No.: US 9,311,685 B2
(45) Date of Patent: Apr. 12, 2016

(54) GEOLOCATION CHECK-IN SYSTEM

(71) Applicant: BANK OF AMERICA CORPORATION, Charlotte, NC (US)

(72) Inventors: Scott Lee Harkey, Concord, NC (US); David M. Grigg, Rock Hill, SC (US); Laura Corinne Bondesen, Charlotte, NC (US); Matthew A. Calman, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 415 days.

(21) Appl. No.: 13/826,671

(22) Filed: Mar. 14, 2013

(65) Prior Publication Data

US 2014/0279123 A1 Sep. 18, 2014

(51) Int. Cl.
*G06Q 30/00* (2012.01)
*G06Q 50/10* (2012.01)
*G06Q 50/00* (2012.01)
*H04L 29/08* (2006.01)
*G06Q 30/06* (2012.01)

(52) U.S. Cl.
CPC ............ *G06Q 50/10* (2013.01); *G06Q 30/0619* (2013.01); *G06Q 50/01* (2013.01); *H04L 67/18* (2013.01); *G06Q 30/0601* (2013.01)

(58) Field of Classification Search
CPC .......... G06Q 30/0241; G06Q 30/0251; G06Q 30/0259; G06Q 30/0261; G06Q 50/10; G06Q 50/12; G06Q 30/06–30/0643; G06Q 50/01; H04L 67/18
See application file for complete search history.

(56) References Cited

U.S. PATENT DOCUMENTS

| | | | | |
|---|---|---|---|---|
| 8,584,940 | B2 * | 11/2013 | Mesaros | 235/383 |
| 2007/0088624 | A1 * | 4/2007 | Vaughn et al. | 705/26 |
| 2007/0136132 | A1 * | 6/2007 | Weiser et al. | 705/14 |
| 2009/0157312 | A1 * | 6/2009 | Black | G01C 21/30 701/414 |
| 2010/0201536 | A1 * | 8/2010 | Robertson et al. | 340/686.6 |
| 2011/0040655 | A1 * | 2/2011 | Hendrickson | 705/27.1 |
| 2012/0209657 | A1 * | 8/2012 | Connolly | 705/7.29 |
| 2012/0233158 | A1 * | 9/2012 | Braginsky et al. | 707/724 |

OTHER PUBLICATIONS

"Location-based 'geo-fencing' apps raise privacy concerns". Jan. 5, 2012 by George Avalos.*
A system for destination and future route prediction based on trajectory mining. Ling Chen, Mingqi Lv, Gencai Chen. College of Computer Science, Zhenjiang University. Sep. 19, 2010.*

* cited by examiner

*Primary Examiner* — William Allen
(74) *Attorney, Agent, or Firm* — Michael A. Springs; Moore & Van Allen PLLC; W. Kevin Ransom

(57) ABSTRACT

Embodiments of the invention are directed to systems, methods and computer program products for providing a geolocation check-in system. An exemplary apparatus is configured to collect positioning data related to a user. After collecting position data the apparatus may be configure to determine, based at least partially on the positioning data that the user has crossed a threshold of a geofence associated with a merchant's location. Based at least partially on this determination the apparatus may be configured to initiate a merchant check-in associated with the user and transmit user information to the merchant.

13 Claims, 7 Drawing Sheets

GEOLOCATION CHECK-IN SYSTEM

BACKGROUND

Typically, users are tasked with manually checking in at merchant locations when they arrive. The current check-in process may cause an additional delay before the user is able to receive the services which the merchant provides. In some instances, where users are able to check-in using their mobile device, there is no way to verify that the user has arrived at the location where they are checking in. At times, users may arrive at merchant locations and not be aware of the merchant check-in system that is available for the user. Therefore, there is a need for a system which allows a user check-in at a merchant location based on geolocation data and allows the user to provide the merchant with pertinent information prior to their arrival.

BRIEF SUMMARY

Embodiments of the invention are directed to systems, methods, and computer program products for providing a geolocation check-in system. In some embodiments, the system may comprise an apparatus for providing a geolocation check-in system. The apparatus may comprise several components, including but not limited to, a memory, a processor, and a module stored in the memory, executable by the processor, and configured to perform a plurality of method steps.

In some embodiments, the apparatus is configured to collect positioning data related to a user. The apparatus may be further configured to determine, based at least partially on the positioning data, the user's current position. This includes further determining, based at least partially on the positioning data, that the user has crossed a threshold of a geofence associated with a merchant's location. In some embodiments, determining that the user has crossed the threshold of the geofence further comprises the apparatus being configured to compare the user's current position to the threshold of the geofence. In some embodiments, the apparatus is further configured to receive one or more parameters which define the geofence associated with the merchant's location.

After determining that the user had crossed a threshold of a geofence associated with the merchant's location the system may initiate a merchant check-in associated with the user. In some embodiments, initiating a merchant check-in associated with the user further comprises processing a merchant check-in on the user's behalf. In some embodiments, the apparatus is further configured to receive one or more user preferences for processing merchant check-ins. In some embodiments, processing a merchant check-in further comprises prompting the user to accept one or more terms and conditions associated with the merchant.

In some instances user information is transmitted to the merchant in conjunction with processing the merchant check-in on behalf of the user. In some embodiments, the apparatus is further configured to store the user information. In some embodiments, the apparatus is further configured to notify one or more entities of a successful merchant check-in.

The system may additionally include a computer program product for providing a geolocation check-in system. In some embodiments, the computer program product comprises a set of codes configured to cause a computer to collect positioning data related to a user. The set of codes may be further configured to cause a computer to determine, based at least partially on the positioning data, that the user has crossed a threshold of a geofence associated with a merchant's location. The set of codes may be further configured to cause a computer to initiate a merchant check-in associated with the user. The set of codes may be further configured to cause a computer to transmit user information to a merchant.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

BRIEF DESCRIPTION OF THE DRAWINGS

Figure 1:
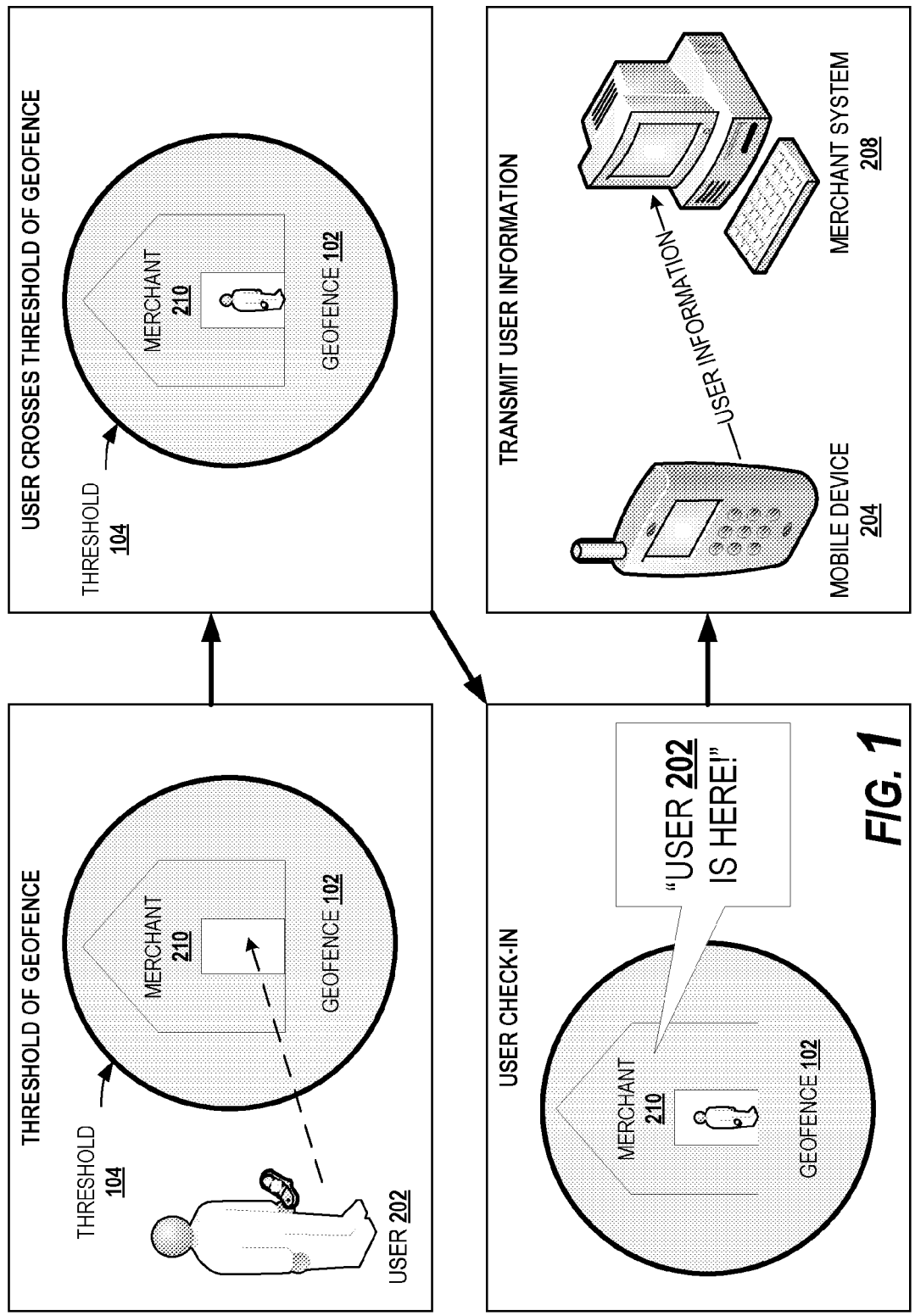
Figure 2:
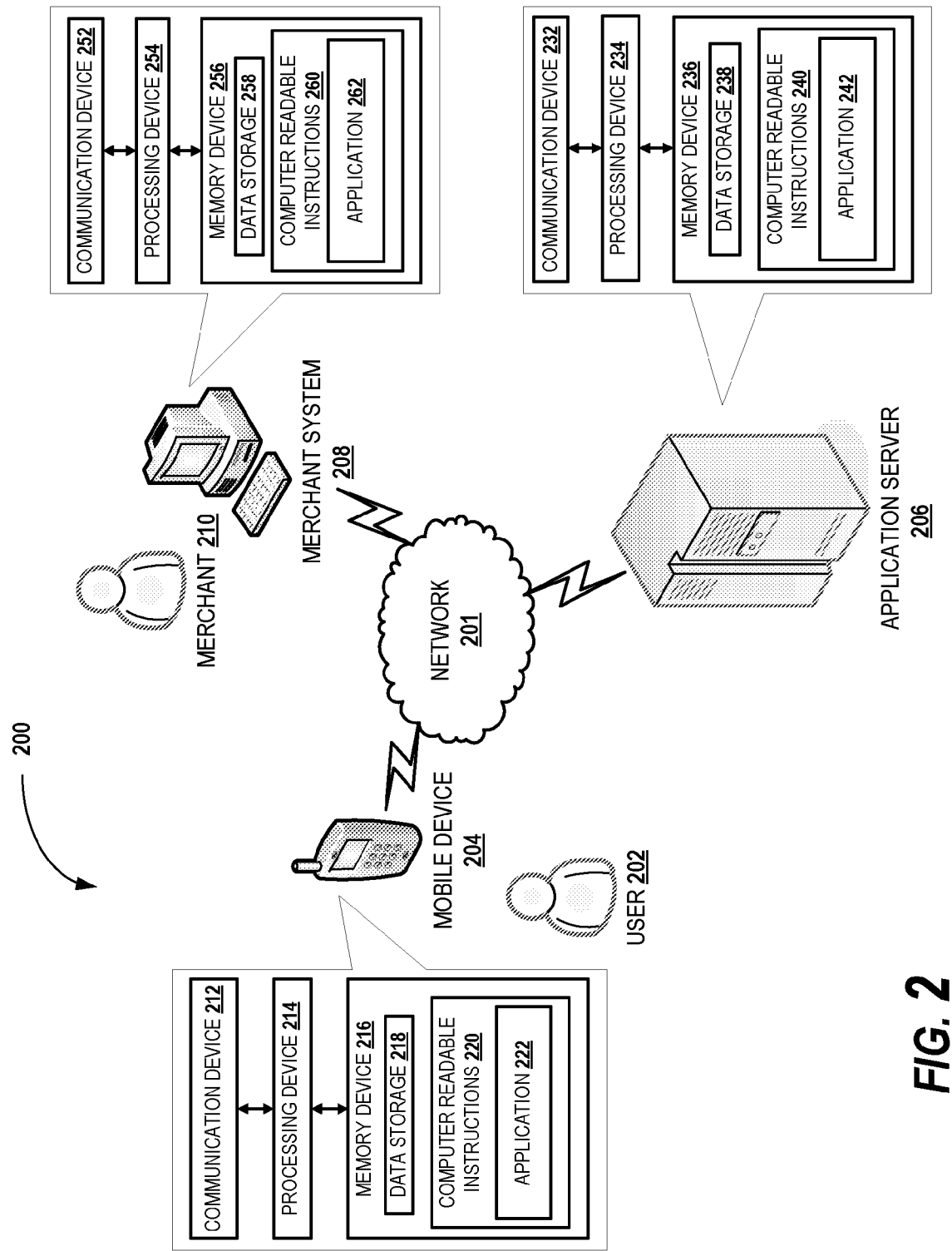
Figure 3:
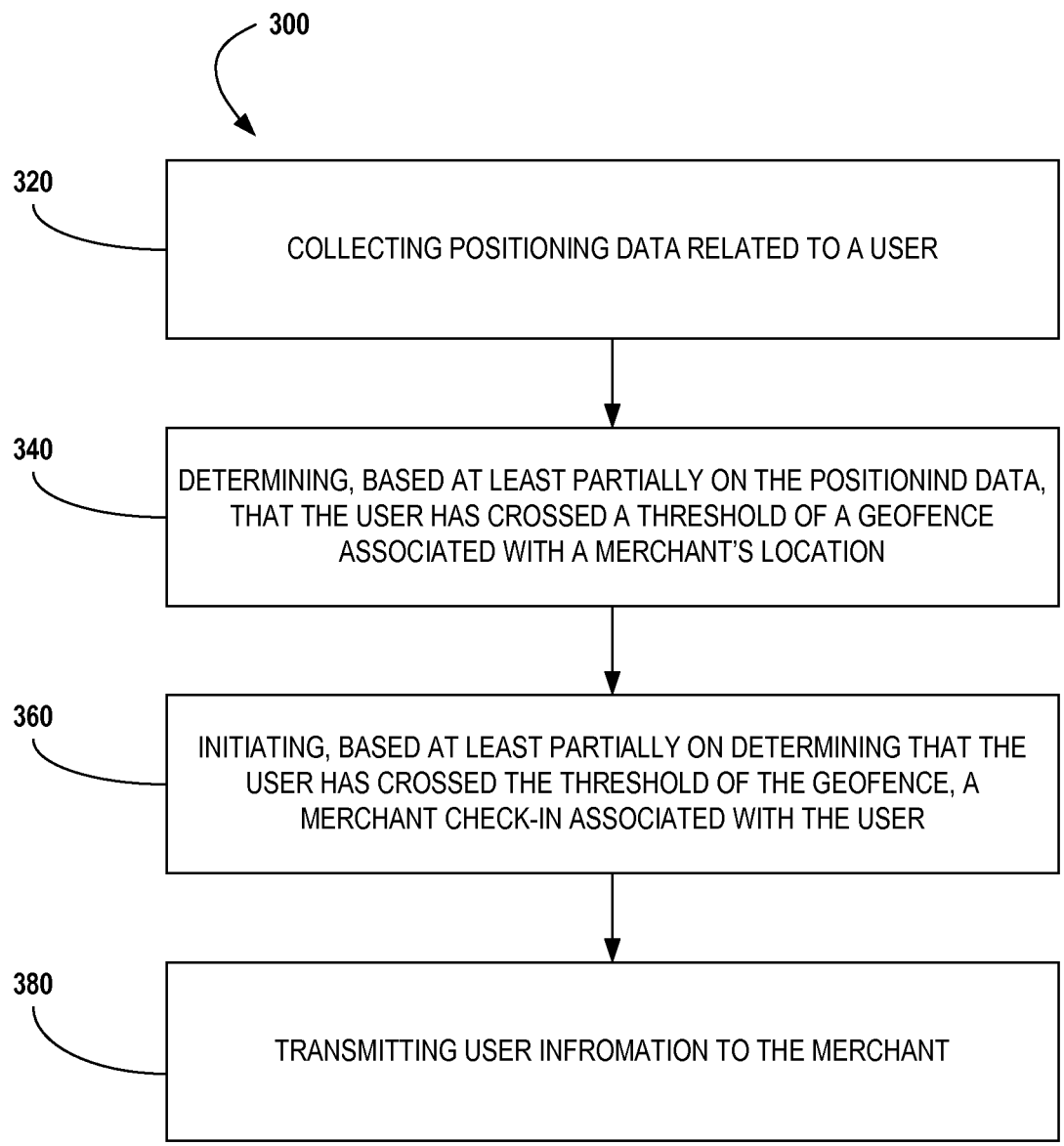
Figure 4:
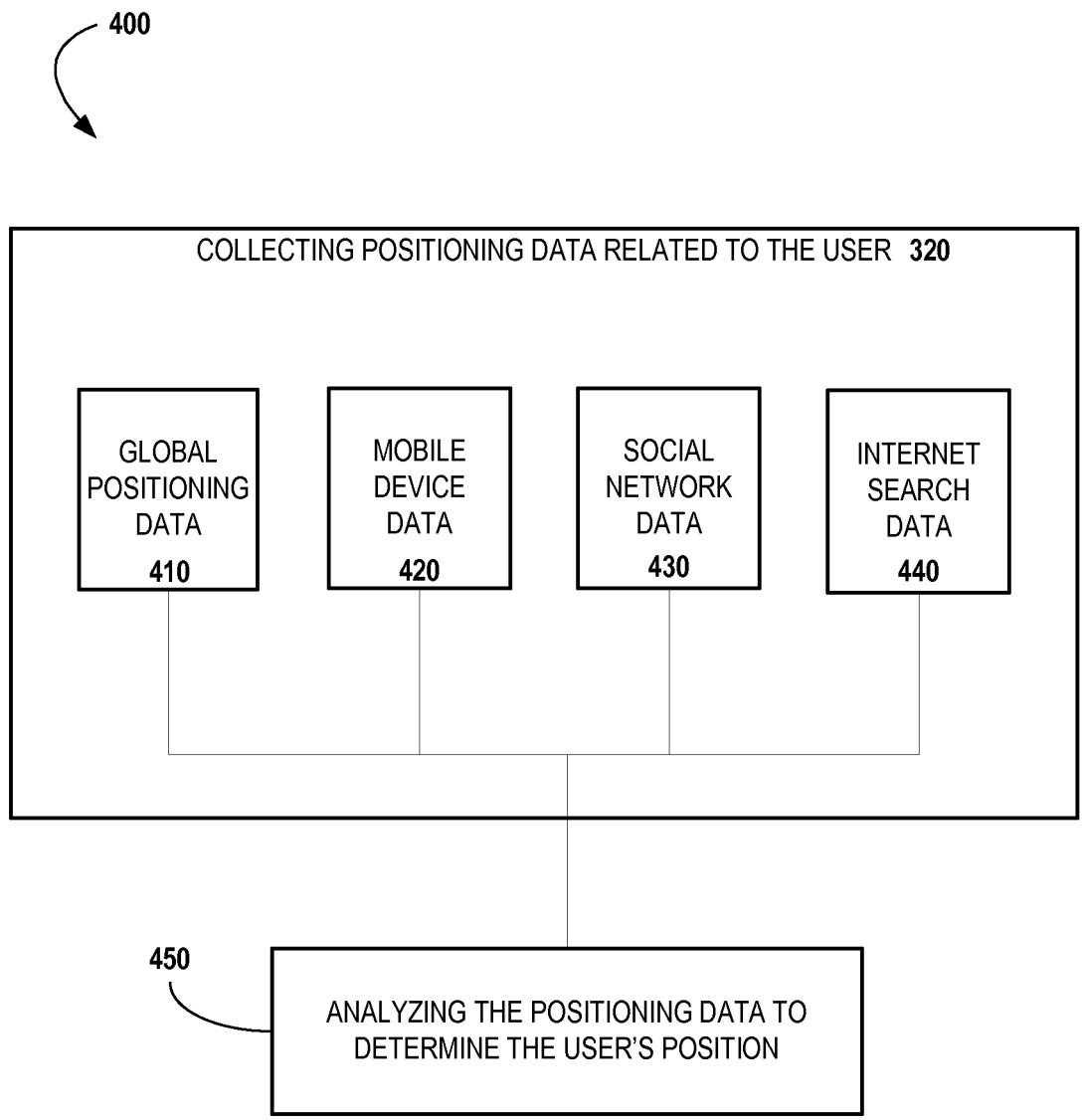
Figure 5:
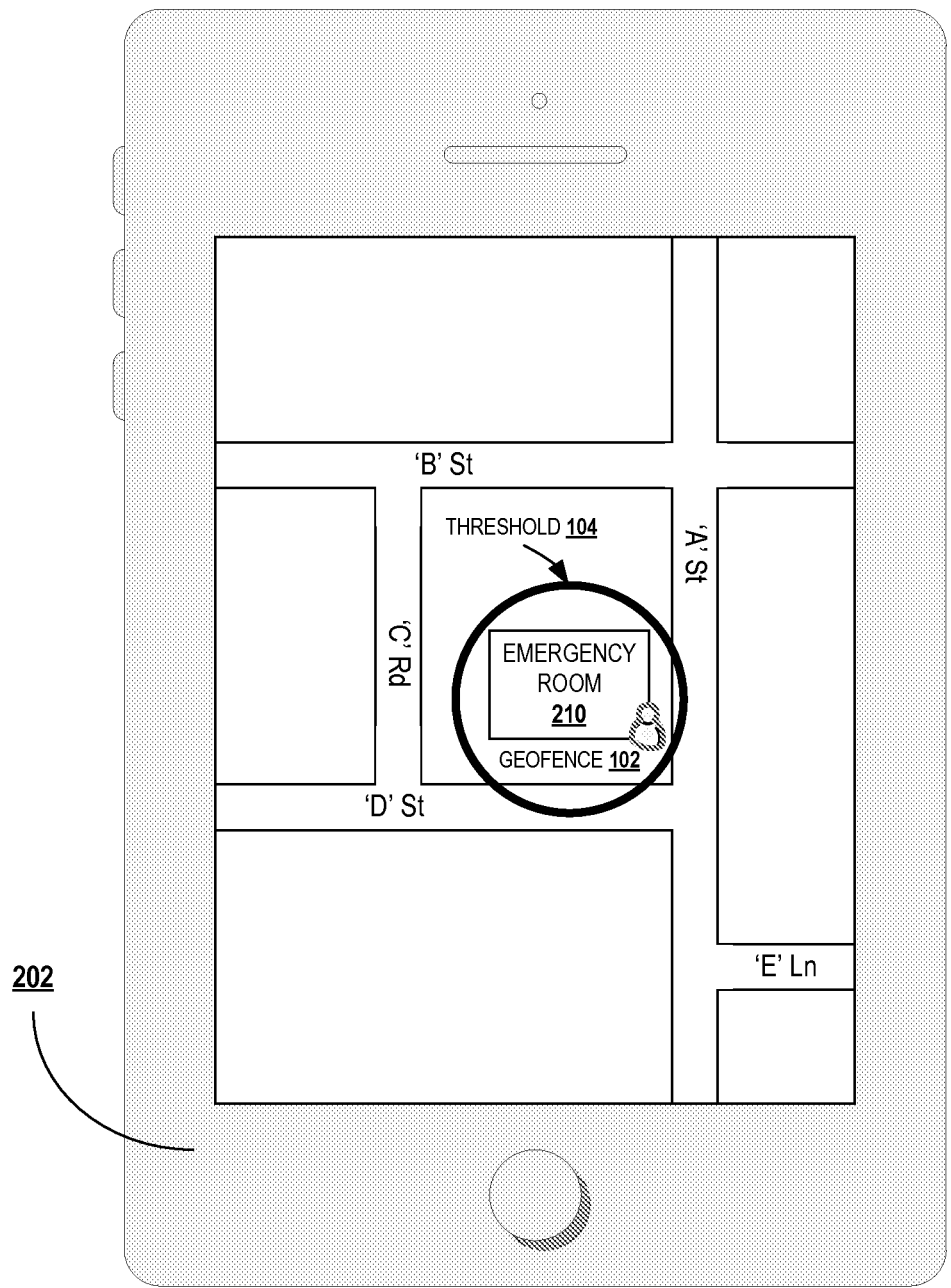
Figure 6:
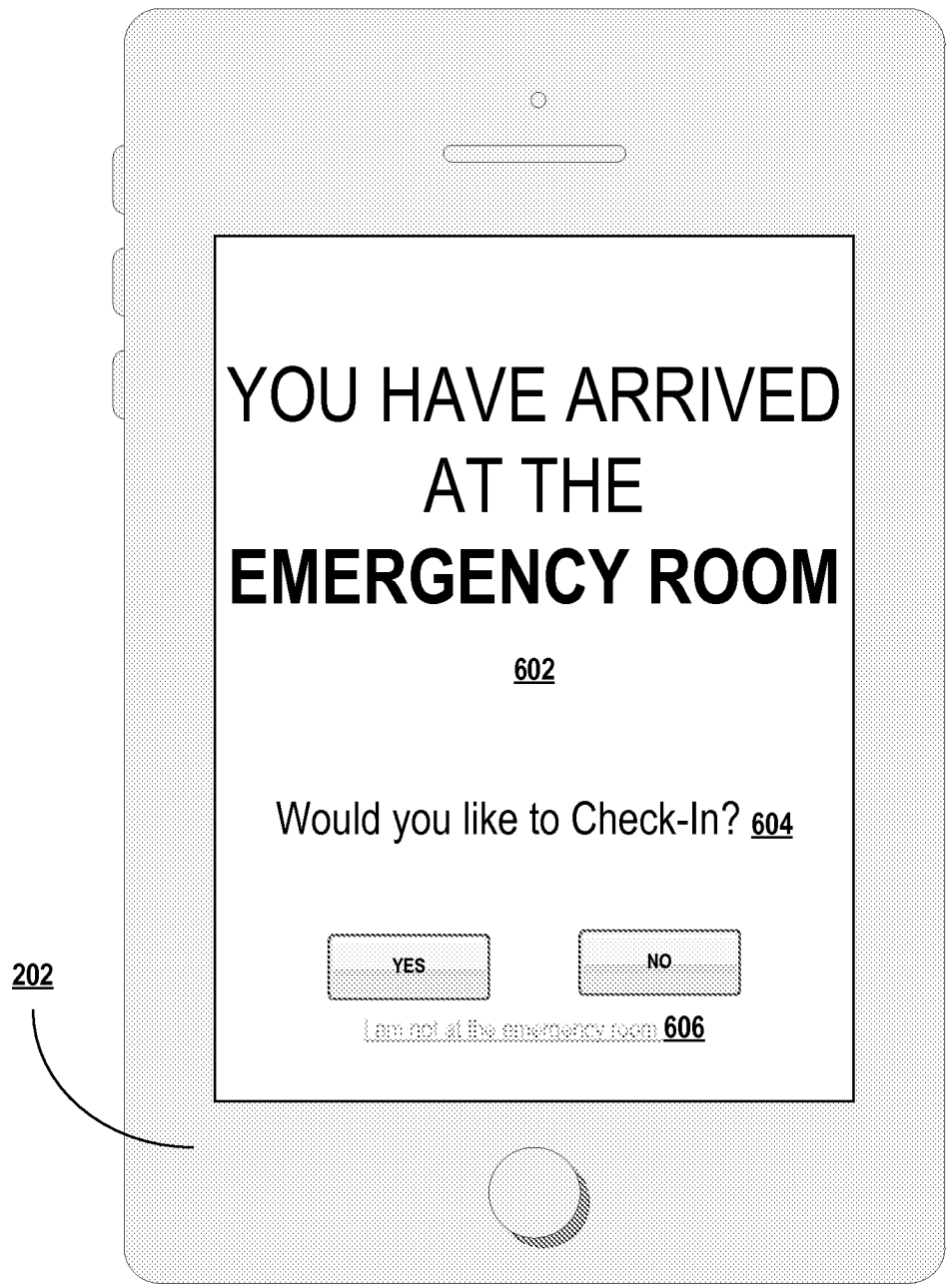
Figure 7:
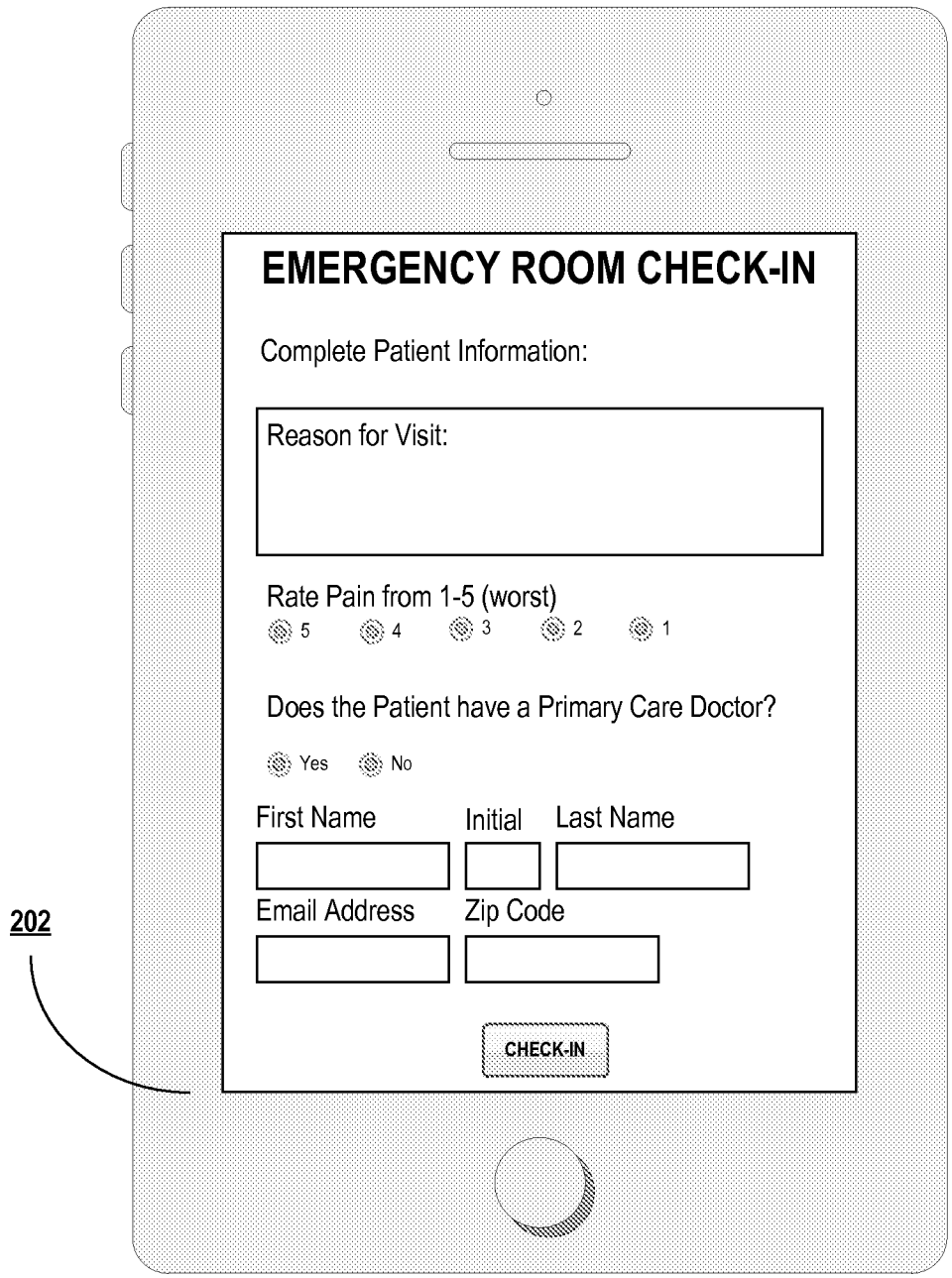

Having thus described embodiments of the invention in general terms, reference will now be made to the accompanying drawings, where:

FIG. 1 is a diagram illustrating a general geolocation check-in system, in accordance with embodiments of the present invention;

FIG. 2 is a diagram illustrating a geolocation check-in system environment, in accordance with embodiments of the present invention;

FIG. 3 is a flow chart illustrating a general process flow for a geolocation check-in system, in accordance with embodiments of the present invention;

FIG. 4 is a flow chart illustrating a general process flow for determining a user position, in accordance with embodiments of the present invention;

FIG. 5 is a screenshot illustrating a mobile device, in accordance with embodiments of the present invention;

FIG. 6 is a screenshot illustrating a mobile device, in accordance with embodiments of the present invention; and FIG. 7 is a screenshot illustrating a mobile device, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products for providing a geolocation check-in system. The invention enables a user to check-in with a particular merchant in response to the user crossing the threshold of a geofenced merchant region. The invention further provides a means for transmitting information to the merchant in addition to the checking in with the merchant.

For example, a user may cross a threshold of a geofence associated with a drive-thru restaurant. Upon crossing the threshold of the geofence associated with the restaurant the user may be automatically checked in such that their order is transmitted to the restaurant. To this extent, the user's food will be prepared by the time they arrive at the drive-thru window.

As used herein, a "merchant" may refer to a manufacturer, retailer, service provider, event provider, warehouse, supplier, and/or the like. In some embodiments, a "merchant" may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like.

In some embodiments, the merchant may allow a user to establish an account with the merchant. An "account" may be the relationship that the user has with the merchant. Examples of accounts include a non-monetary user profile that includes only personal information associated with the user, a deposit account, such as a transactional account (e.g., a banking account), a savings account, an investment account, a money market account, a time deposit, a demand deposit, a pre-paid account, a credit account, or the like. The account is associated with and/or maintained by the merchant.

As used herein a "user" refers to a previous consumer or a non-consumer of one or more merchants or entities. In some embodiments, the "user" may be a user (e.g., an account holder or a person who has an account (e.g., banking account, credit account, or the like) at the entity) or potential user (e.g., a person who has submitted an application for an account, a person who is the target of marketing materials that are distributed by the entity, a person who applies for a loan that not yet been funded). It should be noted that the terms user, user, and/or consumer may be used interchangeably throughout the specification.

Although embodiments of the present invention described herein are generally described as involving a merchant, it will be understood that the merchant may involve one or more persons, organizations, businesses, institutions and/or other entities such as financial institutions, services providers etc. that implement one or more portions of one or more of the embodiments described and/or contemplated herein.

Referring now to FIG. 1, FIG. 1 illustrates a geolocation check-in system according to an exemplary embodiment of the invention. As illustrated in FIG. 1, the merchant 210 may be located within at least a portion of a geofenced region such that a user 202 carrying a mobile device 204 and the merchant are, initially, at least separated by the threshold 104 of the geofence 102. The geolocation check-in process may be initiated in response to the user 202 crossing the threshold 104 of the geofence 102 while carrying their mobile device 204. As such, the mobile device 204 may serve as an apparatus which provides a means for determining the location of the user 202, and in particular determining that the user 202 has crossed the threshold 104 of the geofence 102 associated with the merchant 210. Initiating the check-in process may lead to one or more subsequent events. This may include the merchant 210 receiving a notification that the user 202 has arrived or successfully checked in. This may additionally include exchanging information between the user 202 and the merchant 210 by transmitting information with the use of the mobile device 204 to a merchant system 208.

As illustrated in FIG. 1, the merchant 210 is associated with a geofenced region 102. As used herein, a geofence 102 may refer to a virtual perimeter which encompasses a real-world geographic area such as the merchant location. It should be noted that the terms "geofence" and "geofenced region" may be used interchangeably throughout the specification. FIG. 1 further illustrates a threshold 104 of the geofence 102. As used herein, a threshold 104 may refer to the outermost perimeter of the geofenced region 102. In some embodiments, the geofence 102 only includes the parameters of the merchant location and/or building itself. To this extent, in such an embodiment, a user 202 may cross the threshold 104 of the geofence 102 upon entering the front door associated with the merchant building. In other embodiments, the geofence includes a region that is associated with the merchant. This merchant region may include, but not be limited to, the merchant building(s), parking lot(s), parking deck(s), proximate streets, and the like. To this extent, in such an embodiment, a user 202 may cross the threshold 104 of the geofence 102 upon entering the parking lot associated with the merchant building. For example, the merchant 210 may be an educational institution having a plurality of buildings. Thus the geofenced merchant region may be defined by a perimeter which encompasses more than one building.

In the embodiment illustrated in FIG. 1, the entire merchant building is located within the geofenced region 102. However, it should be noted that in other embodiments only a portion of the merchant building may be located within the geofenced region 102. For the purpose of this invention the merchant building and/or location only needs to be at least partially encompassed by the geofenced region 102. To this extent, at least a portion of the merchant building may be located outside of the geofenced region 102. It should be further noted that in other embodiments, the geofenced region 102 may not include any physical buildings. For example, the geofenced region 102 may encompass a general area associated with a merchant location such as a park that is void of physical structures.

Referring now to FIG. 2, a geolocation check-in system environment 200, in accordance with one embodiment of the present invention, is illustrated. As shown, the merchant system 208 is capable of sending and/or receiving information from the application server 206. Likewise, the application server 206 is capable of sending and/or receiving information from the mobile device 204. This communication may occur across the network 201. The network 201 may be a global area network (GAN), such as the Internet, a wide area network (WAN), a local area network (LAN), or any other type of network or combination of networks. The network 201 may provide for wireline, wireless, or a combination wireline and wireless communication between devices on the network.

The application server 206 may include a processing device 234. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The application server 206 may further include a communication device 232 that is operatively coupled to the processing device 234. The communication device 232 is capable of sending user information to the mobile device 204 and/or merchant system 208 in response to determining that the user 202 has crossed the threshold 102 of the geofence 104. The processing device 234 uses the communication device 232 to communicate with the network 201 and other devices on the network 201, such as, but not limited to, the merchant system 208 and the mobile device 204. The communication device 232 generally comprises a modem, server, or other device for communicating with other devices on the network 201.

The processing device 234 is also operatively coupled to the memory device 236. The memory device 236 may house computer-readable instructions 240 which may include a server application 242. In some embodiments, the memory device 236 includes data storage 238 for storing data related to the geolocation check-in system environment 200 including, but not limited to, data used by the server application 242, or information provided by the user 202, mobile device 204, and/or merchant system 208. For example, the data storage 238 may store all user information received from the mobile device 204. The server application 242 may then send the stored user information to the merchant system 208.

The application server 206 may be operatively coupled over a network 201 to the mobile device 204, and, in some embodiments, to the merchant system 208. The merchant system 208 may include an end system and/or interface used by a business, such as a computer terminal. It should also be noted, in some embodiments the mobile device 104 may be interchanged with other end consumer systems, such as a computer. In this way, the application server 206 can send information to and receive information from the mobile device 204 and the merchant system 208 to process a user check-in with the merchant 208 based on geolocation data. FIG. 2 illustrates only one example of an embodiment of a geolocation check-in system environment 200, and it will be appreciated that in other embodiments one or more of the systems, devices, or servers may be combined into a single system, device, or server, or be made up of multiple systems, devices, or servers.

In the embodiment illustrated in FIG. 2, the server application 242 may enable the user 202 and/or the merchant 210 to interact with the system. First, the server application 242 enables a user 202 to receive information based on his/her geographic location proximate to the merchant 210, via the mobile device 104. Next, the server application 142 enables the merchant 210 to manually provide information related to a user check-in, via the merchant system 208. The server application 242 may be capable of sending and/or receiving information to and from the mobile device 204 and the merchant system 208. For example, a mobile device 204 may indicate that the user 202 has crossed the threshold 104 associated with the geofence 102 of a particular merchant location. Once notified, the merchant may send a request for user information that is delivered to the mobile device 204 via the application server 206. Upon receiving the user information the merchant 210 may additionally send a confirmation message that the user 202 has been successfully checked in that is delivered to the mobile device 204 via the application server 206.

In some embodiments, the server application 242 may enable or allow the user 202 to communicate information, using the mobile device 204, related to the user's presence in a location based on the geolocation data provided by the mobile application 222. The information sent from the mobile device 204 may be sent in response to the user 202 crossing the threshold 104 of a geofence 102 while carrying their mobile device 204. In some embodiments, the mobile device 204 may send user information related to checking in with a merchant where the user 202 is currently located. In some embodiments, the user 202 may receive, in response to the sending the information, a confirmation message that the user 202 has successfully checked in with the merchant 210. The confirmation message may include various information such as the location where the user was checked in, the check-in time, a summary of the information sent, and/or the like. A similar confirmation message may be sent to the merchant 210 and subsequently stored on the merchant system 208. The confirmation message may be sent from the merchant system 208 to the mobile device 204 using the application server 206 as an intermediate communication device.

An entity, such as a business, may use the merchant system 208 to provide the server application 242 with information and/or data for inclusion in one or more messages related to the user 202 checking in with the merchant 210. In some embodiments, the message may be a confirmation that the user 202 has been successfully checked in with the merchant 210. The server application 242 may also store user information received from the mobile device 204 and subsequently send the user information to the merchant system 208. In this way, the server application 242 may have access to user information related to prior check-ins, in a database. Thus, the application 242 may need to only receive the user information once and can send merchant 210 user information that has been stored in the database for all subsequent check-ins related to a particular user 202.

The server application 242 may provide computer readable instructions to the processing device 234 to match user information stored in the data storage 238 (which may have previously been, for example, received from the mobile device 204 and stored in the data storage 238 of the application server 206) with a mobile device 204 of a user 202 based on determining the user 202 has crossed the threshold 104 of the geofence 102 associated with a merchant location. The server application 242 may then send the user information to the merchant system 208, using a network 101, to initiate a current check in for the user based on previously stored user information.

The server application 242 may initiate a check-in for a user 202 based on one factor or a combination of factors. For example, application server 206 may consider geolocation data provided by the users 202 mobile device 204 in determining whether or not to initiate the check-in process for a user. Initiating the check-in process may comprise the application server 206 sending the user 202 a message to confirm that they want to check-in with the merchant 210. The user 202 may be presented, via mobile device 204, with an option to either decline or accept checking in with a particular merchant 210 that has indicated the user 202 has arrived at the merchant location. Initiating the check-in process may comprise the application server 206 sending the user 202 a request to provide additional information related to a check-in with the merchant 210. The user's mobile device 204 may send the application server 206 user information that is either stored on the mobile device 204 or has been provided by the user 202. In response, the application server 206 may subsequently send the user information to the merchant system 208. In some embodiments, the application server 206 is owned and operated by the merchant 210. In other embodiments, the application server 206 is owned and operated by a third-party which is independent of the merchant 210.

The merchant system 208 generally includes a communication device 252, a processing device 254, and a memory device 256. The processing device 254 is operatively coupled to communication device 252, and the memory device 256. The merchant system 208 may include an input device such as a keyboard device to receive information from an individual associated with the merchant system 208. The merchant system 208 may additionally include a reader device including, but not limited to, a magnetic strip reader, a barcode scanner, a radio frequency (RF) reader, a character recognition device, a magnetic ink reader, a processor for interpreting codes presented over an electrical or optical medium, a biometric reader, a wireless receiving device, and/or the like. In some embodiments, the reading device receives information that may be used to communicate instructions via the communication device 252 over a network 201, to other systems such as, but not limited to the application server 206 and/or other systems. The communication device 252 generally comprises a modem, server, or other device for communicating with other devices on the network 201.

The merchant system 208 includes computer-readable instructions 260 stored in the memory device 256, which in one embodiment includes an application 262. A merchant system 208 may also refer to any device used to provide information, messages and/or communicate to be sent to a user 202 or the application server 206, including but not limited to, information related to a user 202 checking in with the merchant 210. In some embodiments, the merchant system 208 may refer only to a plurality of components. For example, the merchant system 208 may refer to a user device, or a user device and a merchant device interacting with one another to process a successful merchant check-in.

In some embodiments, the merchant system 208 may serve as an interface between a merchant 210 and the application server 206 or mobile device 204 to enable a merchant to provide a user check-in system. In some embodiments, the merchant system 208 is or includes an interactive computer terminal that is configured to initiate, communicate, process, and/or facilitate a check-in process for the user 202. A merchant system 208 could be or include any device that may be used to communicate with a user 202 or the application server 206, such as, but not limited to, a digital sign, a magnetic-based payment device (e.g., a credit card, debit card, etc.), a personal identification number (PIN) payment device, a contactless payment device (e.g., a key fob), a radio frequency identification device (RFID) and the like, a computer, (e.g., a personal computer, tablet computer, desktop computer, server, laptop, etc.), a mobile device (e.g., a smartphone, cellular phone, personal digital assistant (PDA) device, music-playback device, personal GPS device, etc.), a merchant terminal, a self-service machine (e.g., vending machine, self-checkout machine, etc.), a public and/or business kiosk (e.g., an Internet kiosk, ticketing kiosk, bill pay kiosk, etc.), a gaming device (e.g., Nintendo Wii®, PlayStation Portable®, etc.), and/or various combinations of the foregoing.

In some embodiments, the merchant system 208 may be operated in a public place (e.g., on a street corner, at the doorstep of a private residence, in an open market, at a public rest stop, etc.). In other embodiments, the merchant system 208 is additionally or alternatively operated in a place of business (e.g., in a retail store, post office, banking center, grocery store, factory floor, etc.). In accordance with some embodiments, the merchant system 208 may not be operated by the user of the merchant system 208. In some embodiments, the merchant system 208 is operated by a mobile business operator or a POS operator (e.g., merchant, vendor, salesperson, etc.). In yet other embodiments, the merchant system 208 is owned by the entity offering the merchant system 208 providing functionality in accordance with embodiments of the invention described herein.

The merchant system 208 application 262 enables the merchant system 208 to be linked to the application server 206 to communicate, over the network 201, information related to processing a check-in for the user 202. In this way, the application 262 associated with the merchant system 208 may provide the application server 242 with various information related to the customized check-in process that is offered by the merchant 210. In one example, the user 202 enters a business establishment, the user's mobile device 204 indicates that the user 202 has crossed the threshold 102 of the geofence 104 associated with the merchant location, and sends user information to the application server 206, and receives a confirmation message from the application server 206 that the user has been successfully checked in by the merchant 210.

The application 262 associated with the merchant system 208 may also receive information from the mobile device 204. The application 262 associated with the merchant system 208, in some embodiments, may receive an indication that the user 202 has arrived at the merchant location, such that the application 262 associated with the merchant system 208 may transmit or initiate the transmission of information related to processing a check-in for the user 202.

FIG. 2 also illustrates a mobile device 204. The mobile device 204 may include a communication device 212, a processing device 214, and a memory device 216. The processing device 214 is operatively coupled to the communication device 212 and the memory device 216. The processing device 214 uses the communication device 216 to communicate with the network 201 and other devices on the network 201, such as, but not limited to, the application server 206 and the merchant system 208. The communication device 216 generally has a modem, server, or other device for communicating with other devices on the network 201.

The mobile device 204 may have computer-readable instructions 220 stored in the memory device 216, which in one embodiment includes the user application 222. Application 222 may cause the processing device to send and receive information related to the user's 202 current location, information related to the user 202 crossing a threshold 104 of a geofence 102 associated with a merchant location, user information, and/or information related to the user 202 checking in with the merchant 210. The mobile device 204 may also include data storage 218 located in the memory device 216. The data storage 118 may be used to store information related to information related to the user's 202 current location, the user 202 crossing a threshold 104 of a geofence 102 associated with a merchant location, the user 202 checking in with the merchant 210, and/or the like. A "mobile device" 204 may or include any mobile communication device, such as a cellular telecommunications device (i.e., a cell phone or mobile phone), personal digital assistant (PDA), a mobile Internet accessing device, or other mobile device including, but not limited to portable digital assistants (PDAs), pagers, mobile televisions, gaming devices, laptop computers, cameras, video recorders, audio/video player, radio, GPS devices, any combination of the aforementioned, or the like. Although only a single mobile device 204 is depicted in FIG. 2, the geolocation check-in system 200 may contain numerous mobile devices, similar to mobile device 204.

Referring now to FIG. 3, FIG. 3 illustrates a method for providing a geolocation check-in system, in accordance with embodiments of the claimed invention. The method may comprise one or more steps detailed by the events listed below. At event 320 positioning data related to the user 202 is collected in order to determine the users 202 current position. Based at least partially on the positioning data, at event 340, the system may determine that the user 202 has crossed the threshold 104 of the geofence 102 associated with the merchant's 210 location. At event 360, based at least partially on determining that the user 202 has crossed the threshold 104 of the geofence 102, the system may initiate the process for the user 202 to check-in with the merchant 210. At event 380, user information may be transmitted to the merchant 210. It should be noted that the following method is not limited to the aforementioned events, and may include one or more additional steps discussed in further detail below. It should be further noted that the aforementioned events may occur in a different order than what is depicted in FIG. 1, or may occur simultaneously with one another.

FIG. 4 illustrates a general process flow 400 for collecting positioning data of the user, consistent with embodiments of the present invention, and in particular event 320 of FIG. 1. As represented by block 410, the positioning data may include global positioning data. Global positioning data may include any information collected from methods, systems, apparatus, computer programs etc. involving locating a user's position relative to satellites, fixed locations, beacons, transmitters or the like. In some instances, global positioning data may be collected from a GPS device, such as a navigation system. Such a navigation system may be, but is not limited to, hardware and/or software that are part of a mobile phone, smartphone, PDA, automobile, watch etc. or a commercially available personal navigation system. The amount, nature and type of the global positioning data that is collected may depend on the merchant's relationship with the user and the amount of information that the user has authorized the merchant or third-party provider to collect. For instances in some embodiments the global positioning data will be snapshots of the user's location at different times. For example, a snapshot of the user's location may be collected each time the GPS software, navigation system or application is activated. The global positioning data may also include the destination entered by the user, recent searches for locations, attractions, addresses etc. In other instances, the global positioning data may be the complete route being provided to the GPS system's user, including destination, route, alternate routes, anticipated time of arrival etc. In some such embodiments, the global positioning data may include an indication if the user selects a detour from a previously selected route, or instructs the navigation system to reach the desired location taking specific roads or avoiding certain roads. In instances where the user's complete route is provided, additional positioning data may not be necessary to project the route of the user or can be used to confirm the user is traveling on along the suggested route.

As shown in block 420 of FIG. 2, positioning data of the user may include mobile device data. Mobile device data may include information regarding the location of the user's mobile device. Such a mobile device may include, but is not limited to, a cellular telecommunications device (e.g., a cell phone or mobile phone), personal digital assistant (PDA), smartphone, a mobile Internet accessing device, or other mobile device including, but not limited to portable digital assistants (PDAs), pagers, gaming devices, laptop computers, tablet computers, and any combination of the aforementioned, or the like. For instance, the location of the mobile phone may be dynamically determined from the cell phone signal and cell towers being accessed by the mobile phone. In other instances, a mobile device may include software or hardware to locate the position of the mobile phone from GPS signals, wireless network locations, and the like. Mobile device data may additionally include data related to the mobile network associated with the mobile device. For instance, the system may determine the location of a mobile device based on the mobile network towers in which the mobile device is currently using. Mobile device data may further include information from an accelerometer that is a part of the mobile device and provides information regarding whether the mobile device is moving, and if so, in what direction. In some embodiments, mobile device data may be the time and location of calls placed using the telephone functionality of a mobile device. In yet other embodiments, the mobile device data may be data collected and analyzed by the hardware and/or software of the mobile device concerning the surrounding environment. In such embodiments, hardware, such as a video capture device, camera or the like and software that is stored in the memory of a mobile device captures a video stream of the environment surrounding the mobile device and through object recognition, compass direction, the location of the mobile device, and other such data identifies information about the objects identified in the surrounding environment and/or the environment itself. For example, in use, a user may use the camera built into her smartphone to collect a real-time video stream that includes images of the façade of a store front and the surrounding area. This image may include the store's name from a marquee, a street address (collected from an image of the numbers on the building and of street signs in the video image) and the direction the smartphone is facing (from a compass in the mobile device). Such information may be sufficient to locate the user's position and potentially the direction the user is facing and/or traveling.

Referring now to block 430, the positioning data of the user may also be collected from social network data. It will also be understood that "social network" as used herein, generally refers to any social structure made up of individuals (or organizations) which are connected by one or more specific types of interdependency, such as kinship, friendship, common interest, financial exchange, working relationship, dislike, relationships, beliefs, knowledge, prestige, geographic proximity etc. The social network may be a web-based social structure or a non-web-based social structure. In some embodiments, the social network may be inferred from financial transaction behavior, mobile device behaviors, etc. The social network may be a network unique to the invention or may incorporate already-existing social networks as well as any one or more existing web logs or "blogs" forums and other social spaces. Social network data may indicate the user's recent, present or future location through expressed data. For instance, a user may upload a blog post, comment on a connection's page, send a friend an electronic message etc. that she is traveling to a specific location or that she is currently in a specific city, or on a specific road etc. Moreover, many already-existing social networks provide users with the ability to "check-in", "flag" or otherwise indicate the user's current location. Accordingly, user positioning data collected from social networking data may consist of such indications. Furthermore, many social networks allow users to rate, like, comment etc. on restaurants, attractions, locations and the like. Accordingly, a user may indicate that she ate at a certain restaurant or business at a given time and thereby provide information about her location at that time. Furthermore, a user may upload photographs to a social networking site and thereby provide information about the user's location. In some instances the user's location may be determined from the picture, (for example a picture of a state line sign, a highway sign, a mile marker etc.) or a caption associated with the picture may indicate the user's location and/or the time the photo was taken.

As shown in block 440, the positioning data of the user may also be collected from Internet data. Internet data, may include any information relating to the searches conducted by the user, website's visited by the user and the like that suggests the user's present or future location(s). For instance, in preparing for a vacation a user may conduct searches for hotels, restaurants or activities in the area where the user will be staying. Similarly, a user may review weather forecasts for locations other than her place of residence indicating that she may soon be traveling to that location. A user may also search for construction or traffic reports indicating future travel along certain roads. Moreover, changes in search patterns may suggest a user's future location. For instance if a user usually uses a web browser application just to read online news articles or to check sports scores but suddenly begins to search for camping gear, hiking manuals and boots it may be indicative that the user is anticipating taking a hiking trip and will be traveling away from her home area. It will be understood that such Internet data may relate to searches or websites visited by the user before she began traveling, however, inasmuch as many mobile devices also include mobile Internet connectivity, it will also be understood that such information may be dynamically collected as the user travels.

As shown by block 450, once the positioning data of the user is collected from one or more of the global positioning data 410, mobile device data 420, social network data 430 and Internet data 440, the positioning data is analyzed to determine the user's 202 current position. It will be understood that the positioning data may be data that is available directly to the mobile device 204, the merchant 208, or data that is collected by other merchants or a third-party service provider and then provided to the merchant.

In some embodiments, analyzing the position data to determine the user's position further comprises analyzing the positioning data to project the user's likely route of travel and anticipate a user's check-in. For example, in use, a user in New York City may engage in a transaction consisting of using a credit card to pay a cab fare. The user's GPS device on her mobile phone, or a phone call placed around the same time, may indicate that she is still in New York but a review of her social networking data indicates she has checked-in on her social networking page at La Guardia International Airport. Internet data from the user's mobile phone indicates that she has recently checked the weather a number of times in San Diego, Calif. Based on this information, the system may determine that the user is likely traveling by plane from New York to San Diego and anticipate the user checking at an airport in San Diego. As such the system may send the merchant 208 a notification indicating the user is in route to the merchant 202. In response to anticipating a user's 202 arrival the system may further monitor for the user 202 to cross the threshold 104 of the geofence 102 associated with the merchant 208.

In some instances in projecting the user's likely route of travel, the projection will be based on the information currently being collected, e.g. the user's current GPS location, the most recent social network and Internet search data etc. In other instances, the current data will be combined with historical positioning data to project the user's likely route of travel. For instance, if historical positioning data indicates that when the user leaves her home traveling south bound and then turns onto a specific highway, ninety percent of the time she is traveling to the beach, this information might be used in the future to project the user's likely route of travel when she begins to follow a similar route. Similarly, the positioning data being currently collected about the user may be combined with information regarding the travel patterns of other users in similar situations to project the user's likely route of travel. For instance, if the user is a young professional of a known income level and the current positioning data indicates that the user is traveling west on an interstate at 5:00 p.m. on a Friday afternoon, this data may be combined with information concerning the travel patterns of other young professionals with similar income levels to identify a likely route of travel and anticipate the user checking in at a business meeting.

In some embodiments, determining that the user 202 has crossed a threshold 104 of the geofence 102, at event 340, further comprises comparing the positioning data and/or the users 202 current position to the threshold 104 of the geofence 102. In one embodiment, the threshold 104 of the geofence 102 may be defined by a plurality of points, where the points may be latitude/longitude coordinate pairs. The system 200 may continuously monitor the users 202 current position in comparison to one or more points and determine that the user 202 has crossed a threshold 104 of the geofence 102 when at least one point is equivalent to the current position of the user 202. In other embodiments, the system may establish a first and second region, where the first region is equivalent to the geofenced region 102 and the second region is any geographic area that is not included in the geofenced region 102, and determine that the user 202 has crossed a threshold 104 of the geofence 102 when the current position of the user 202 is equivalent to a point within the first region.

In some embodiments, determining that the user determining that the user 202 has crossed a threshold 104 of the geofence 102, at event 340, further comprises sending one or more entities and alert and/or notification message indicating that the user 202 has crossed a threshold 104 of the geofence 102. The alert and/or notification message may include, but not be limited to, text messages, multimedia messages, email messages, and/or the like.

In some embodiments, determining that the user 202 has crossed a threshold 104 of the geofence 102 further comprises defining the geofenced region 102. It should be noted that although, in some embodiments, determining that the user 202 has crossed the threshold 104 at event 340 occurs subsequent to collecting positioning data at event 320, the geofenced region 102 may be defined prior to collecting the positioning data at event 320. The geofence 102 may be defined by one or more entities, including but not limited to, a merchant 210, a user 202, or a third-party not associated with either the merchant or the user. Defining a geofence 102 may comprise an entity providing one or more parameters which specify the geographic area and/or region which the geofence 102 encompasses. The one or more parameters which define the geofenced region 102 may be received by the mobile device 202, application server 206, and/or the merchant system 208. Defining a geofence 102 may also comprise the geofence being embodied by a plurality of shapes. For example, the geofence 102 may be circular, rectangular, a polygon, an organic shape, a street linked shape, and/or the like. For example, the geofence 102 may be a closed polygon defined over a geographical area. The geofence 102 may be defined as either an area of inclusion or an area of exclusion.

In some embodiments, the geofence 102 is explicitly defined. For example, the geofence 102 may be defined by one or more latitude/longitude coordinate pairs. In such an embodiment each coordinate may form a corner of the geofence 102. In an embodiment where the geofence 102 is circular, the geofence 102 may be defined by a latitude/longitude coordinate pair which specifies the center point of the geofence 102 and a radius and/or diameter which specifies the length to which the region extends from the center point of the geofence 102. The number of coordinates required may vary depending on the type of geofence 102. In another example, the geofence 102 may be defined by one or more streets on which the merchant 210 is either located or surrounded by.

In other embodiments, the geofence 102 is inexplicitly defined. For example, the geofence 102 may be defined by an organic shape which is drawn on a map and specifies a region in which the merchant 210 is located. In such an embodiment, the system may be further configured to determine based on the organic shape one or more latitude/longitude coordinate pairs which define the geofence 102.

Defining the geofence 102 may comprise the system prompting and/or requesting and/or requesting an entity such as the user 202 or the merchant 210 to provide information related to specifying the region to be associated with the geofence 102. For example, the system may prompt the entity to enter one or more latitude/longitude coordinate pairs which define the geofence 102. In another example, as illustrated in FIG. 5, the system may request the entity to draw on a map a region which defines the geofence 102. In yet another example, the system may request the entity to specify one or more streets on which the merchant 210 is either located or surrounded by. As further illustrated in FIG. 5, when defining the geofence 102 of the Emergency Room, the entity may specify that the geofenced is defined by the boundaries of 'A' Street, 'C' Street, and 'D' Street.

In some embodiments, defining the geofenced region 102 may further comprise verifying and/or determining that the defined region is accurate. For example, if a geofence 102 is defined by the user 202, the merchant 210 may subsequently verify that the merchant 210 location is indeed within the defined region. In another example, the geofence 102 may be defined by the merchant. Upon receiving a notification, on their mobile device 204, that the user 202 has crossed the threshold 104 of the geofence 102 the user 202 may indicate that they are not at the merchant location 606, as illustrated in FIG. 6. Determining that a geofenced region 102 is either accurate and/or inaccurate may further comprise notifying one or more entities geofenced region 102 is either accurate and/or inaccurate, via a message or the like. If it is determined that the geofenced region 102 is not accurate the system may request an entity, that is either responsible for defining the geofence 102 or determining the geofence 102 is inaccurate, to redefine the geofenced region 102. For example, the system may prompt the entity to enter one or more latitude/longitude coordinate pairs which redefine the geofenced region 102.

The parameters of a geofence 102 may be stored in various locations. For example, the parameters of the geofence may be stored on the mobile device 204, application server 206, merchant system 208, a dynamic GPS system (which may be accessed by any device within the system 200), a third-party system, and/or the like. In some embodiments, the parameters of the geofence 102 are stored in the memory 216 of the mobile device 204. For example, the mobile device 204 may compare the users 202 current position to the parameters of the geofence 102, which are stored in the memory 216, to determine that the user 202 has crossed the threshold 104 of the geofence 102. The mobile device 204 may alternatively transmit the users 202 current position and the parameters of the geofence 102, which are stored in the memory 216, to a second device, such as the application server 206, for the second device to determine that the user 202 has crossed the threshold 104 of the geofence 102. In an instance that a second device determines that the user 202 has crossed the threshold 104 of the geofence 102, the second device may send a notification message and/or alert to the first device (e.g. mobile device 204) indicating that the user 202 has crossed the threshold 104 of the geofence 102.

In some embodiments, the parameters of the geofence 102 are stored in the memory 256 of the merchant system 208. For example, the merchant system 208 may receive the users 202 current position from a second device, such as the mobile device 204, and compare the users 202 current position to the parameters of the geofence 102, which are stored in the memory 216, to determine that the user 202 has crossed the threshold 104 of the geofence 102. The merchant system 208 may alternatively transmit the parameters of the geofence 102, which are stored in the memory 256, to a second device, such as the application server 206, for the second device to determine that the user 202 has crossed the threshold 104 of the geofence 102. In an instance that a second device determines that the user 202 has crossed the threshold 104 of the geofence 102, the second device may send a notification message and/or alert to the first device (e.g. merchant system 208) indicating that the user 202 has crossed the threshold 104 of the geofence 102.

In other embodiments, the parameters of the geofence 102 are stored in the memory 236 of the application server 206. For example, the application server 206 may receive the users 202 current position from a second device, such as the mobile device 204, and compare the users 202 current position to the parameters of the geofence 102, which are stored in the memory 236, to determine that the user 202 has crossed the threshold 104 of the geofence 102. The application server 206 may alternatively transmit the parameters of the geofence 102, which are stored in the memory 236, to a second device, such as the mobile device 204 or the merchant system 208, for the second device to determine that the user 202 has crossed the threshold 104 of the geofence 102. In an instance that a second device determines that the user 202 has crossed the threshold 104 of the geofence 102, the second device may send a notification message and/or alert to the first device (e.g. application server 206) indicating that the user 202 has crossed the threshold 104 of the geofence 102.

In some embodiments, initiating a user check-in with the merchant 210, at event 360, may further comprise automatically checking the user 202 in with the merchant 210. The automatic check-in may be initiated based at least partially on determining that the user 202 has crossed the threshold 104 of the geofence 102. In an instance where a user 202 is automatically checked in with a merchant upon crossing the threshold 104 of the geofence 102 the system 200 may send the user 202 alert and/or notification message, via the mobile device 204 which the user is carrying, indicating that the user 202 has been automatically checked in with the merchant 210. The alert and/or notification message may include, but not be limited to, text messages, multimedia messages, email messages, and/or the like. The user 202 may opt-in to the functionality of automatic check-ins. In an instance, where the user 202 has not opted into the functionality for automatic check-in the user 202 may be prompted to verify that they want to check in with the merchant 210 prior to being checked in. In some embodiments, the user 202 may set preferences for check-ins. For example, the user 202 may specify that they want to be automatically checked in at all merchant locations. In another example, the user may specify that they want to be checked in at only certain merchant locations. In some embodiment, the option for selecting user preferences may be presented as a menu on a display associated with the mobile device 204. The menu may comprise a list of all merchants that the user has previously visited, and the user may customize their check-in process for each individual merchant. In another embodiment, the menu may present a list of merchant that are within the geographic area where the user is currently located.

In some embodiments, initiating a user check-in with the merchant 210, at event 360, may further comprise prompting and/or requesting the user 202 to verify that they want to check in with the merchant 210, as illustrated in FIG. 6. Prompting and/or requesting the user 202 to verify that they want to check in with the merchant 210 may be initiated based at least partially on determining that the user 202 has crossed the threshold 104 of the geofence 102. Prompting and/or requesting the user 202 to verify that they want to check in with the merchant 210 may comprise presenting on the mobile device 204, which the user is carrying, a notification 602 indicating the user 202 has entered the geofence of a particular merchant 210, a request 604 for the user 202 to verify they would like to check in, and/or an option 606 for the user 202 to specify the notification 602 is inaccurate. The user 202 may respond to the request 604 by either accepting or declining a check-in with the merchant 210. In an instance where a user 202 declines to be checked in with a merchant 210 upon crossing the threshold 104 of the geofence 102 the system 200 may send an alert and/or notification message to an entity (e.g. merchant 210, mobile device 204) indicating that the user 202 has declined to be checked in with the merchant 210. In an instance where the user 202 accepts the option to be checked in with the merchant 210 upon crossing the threshold 104 of the geofence 102, the system 200 may send an alert and/or notification message to an entity (e.g. merchant 210, mobile device 204) indicating that the user 202 has accepted the option to be checked in with the merchant 210. The alert and/or notification message may include, but not be limited to, text messages, multimedia messages, email messages, and/or the like.

In some embodiments, checking in with a merchant 210 further comprises notifying the user 202 of a successful and/or unsuccessful check-in with the merchant 210. In some embodiments, checking in with a merchant 210 further comprises the user 202 checking in with merchant 210 on one or more social networks. Checking in with merchant 210 on one or more social networks may comprise presenting on the mobile device 204, which the user is carrying, a request 604 for the user 202 to verify they would like to check in with the merchant on one or more social networks. The user 202 may respond to the request 604 by either accepting or declining a check-in with the merchant 210 on one or more social networks. Checking in with merchant 210 on one or more social networks may additionally comprise the user 202 providing one or more login and/or verification credentials associated with the social network prior to checking in with the merchant 210 on the social network. In other embodiments, checking in with the merchant 210 on a social network may occur simultaneously and/or automatically in conjunction with a general check-in with the merchant 210.

In some embodiments, checking in with a merchant 210 further comprises the user 202 accepting one or more terms and conditions associated with the merchant 210. Accepting one or more terms and conditions associated with the merchant 210 may comprise presenting on the mobile device 204, which the user is carrying, a request 604 for the user 202 to accept and/or decline one or more terms and conditions associated with the merchant 210. The user 202 may respond to the request 604 by either accepting or declining one or more terms and conditions associated with the merchant 210. In an instance where a user 202 declines to accept one or more terms and conditions associated with the merchant 210, the system 200 may send an alert and/or notification message to an entity (e.g. merchant 210, mobile device 204) indicating that the user 202 has declined to accept one or more terms and conditions associated with the merchant 210. In an instance where the user 202 accepts one or more terms and conditions associated with the merchant 210, the system 200 may send an alert and/or notification message to an entity (e.g. merchant 210, mobile device 204) indicating that the user 202 has accepted accept one or more terms and conditions associated with the merchant 210. The alert and/or notification message may include, but not be limited to, text messages, multimedia messages, email messages, and/or the like.

In some embodiments, user information is not initially stored on a device within the system. As such, in some embodiments, transmitting user information to the merchant 210, at event 380, may further comprise requesting the that the user information be provided prior to transmitting the user information. The user information may be provided via various devices. The user information may be provided via the mobile device 204, application server 206, a third-party system, and/or the like. In some embodiments, the check-in occurs in response to an entity providing user information. For example, as illustrated in FIG. 7, the system 200 may present the user 202 a form, via the mobile device 204, to provide user information and check the user 202 in with the merchant 210 in response to the user information being provided. If a device within the system 200 determines that the information provided is inaccurate, the system may subsequently send a notification and/or alert message indicated that the check-in was unsuccessful due to inaccurate user information, requesting that the entity correct the user information, and/or a combination of both indicating that the check-in was unsuccessful due to inaccurate user information and requesting that the entity correct the user information such that it is accurate.

In some embodiments, transmitting user information to the merchant 210 may further comprise storing the user information. The user information may be stored in various locations. The user information may be stored on the mobile device 204, application server 206, merchant system 208, a third-party system, and/or the like. In some embodiments, the user information is initially stored in the memory 216 of the mobile device 204. For example, the mobile device 204 may initially store the user information and transmit the user information, to a second device, such as the merchant system 208 or application server 206. The user information may additionally be subsequently stored in the memory of the second device after being transmitted from the mobile device 204. In some embodiments, the user information is transmitted to the merchant 210 directly from the mobile device 204. For example, the user information may be stored in the memory 216 of the mobile device 204 and directly transmitted to the merchant system 208, via the communication devices 212, 252. In other embodiments, the user information is transmitted to the merchant 210 indirectly from the mobile device 204. For example, the user information may be stored in the memory 216 of the mobile device 204 and transmitted the application server 206, via the communication devices 212, 232. The user information may then be transmitted from the application server 206 to the merchant system 208, via the communication devices 232, 252.

In some embodiments, the user information is initially stored in the memory 236 of the application server 206. For example, the application server 206 may initially store the user information and transmit the user information, to a second device, such as the merchant system 208. The user information may additionally be subsequently stored in the memory of the second device after being transmitted from the application server 206. In some embodiments, the user information is transmitted to the merchant 210 directly from the application server 206. For example, the user information may be stored in the memory 236 of the application server 206 and directly transmitted to the merchant system 208, via the communication devices 232, 252. In other embodiments, the user information is transmitted to the merchant 210 indirectly from the application server 206. For example, the user information may be stored in the memory 216 of the application server 206 and transmitted the mobile device 204, via the communication devices 232, 212. The user information may then be transmitted from the mobile device 204 to the merchant system 208, via the communication devices 212, 252. In some embodiments, the user information is transmitted to multiple devices. For example, the user information may comprise flight information which is stored on an application server 206 associated with the airlines such that the user information is transmitted to the mobile device 204 and the merchant system 208 associated with the airlines, in response to the user 202 crossing the threshold 104 of the geofence 102 associated with the airport.

In some embodiments, transmitting user information the merchant 210, at event 380, may further comprise automatically transmitting user information the merchant 210. The automatic transmission of user information may be initiated in response to a user check-in with the merchant. In an alternative embodiment, an automatic check-in with the merchant occurs in response to the transmission of user information. The automatic transmission of user information may also be initiated in response to a request for the user information to be transmitted. In an instance where a user information is automatically transmitted the system 200 may send the user 202 alert and/or notification message, via the mobile device 204 which the user is carrying, indicating that the user information has been automatically transmitted to the merchant. The alert and/or notification message may include, but not be limited to, text messages, multimedia messages, email messages, and/or the like. The user 202 may opt-in to the functionality for automatically transmitting of user information. In an instance, where the user 202 has not opted into the functionality for automatically transmitting user information the user 202 may be prompted to verify that they want to transmit user information to the merchant 210 prior to the user information being sent. In some embodiments, the user 202 may set preferences for automatically transmitting user information. For example, the user 202 may specify that they want their user information to be automatically transmitted at all merchant locations. In another example, the user may specify that they only want their user information to be automatically transmitted at certain merchant locations.

In some embodiments, transmitting user information to the merchant 210, at event 380, may further comprise prompting and/or requesting the user 202 to verify that they want to transmit user information to the merchant 210. Transmitting user information to the merchant 210 may be initiated based at least partially on determining that the user 202 has crossed the threshold 104 of the geofence 102. Transmitting user information to the merchant 210 may comprise presenting on the mobile device 204, which the user is carrying, a notification 602 indicating the user 202 has entered the geofence of a particular merchant 210 and a request 604 for the user 202 to verify they would like to transmit user information to the merchant 210. The user 202 may respond to the request 604 by either accepting or declining to transmit user information to the merchant 210. In an instance where a user 202 declines to transmit user information to the merchant the system 200 may send an alert and/or notification message to an entity (e.g. merchant 210, mobile device 204) indicating that the user 202 has declined to transmit user information to the merchant 210. In an instance where the user 202 accepts the option to transmit user information to the merchant 210 the system 200 may send an alert and/or notification message to an entity (e.g. merchant 210, mobile device 204) indicating that the user 202 has accepted the option to transmit user information the merchant 210. The alert and/or notification message may include, but not be limited to, text messages, multimedia messages, email messages, and/or the like.

In some embodiments, the user information may comprise one or more encryption and/or decryption keys related to information being transmitted. As such the information may be encrypted prior to being transmitted to the merchant, and the merchant may additionally receive a key for decrypting the user information that is received. In some embodiments, the user information may comprise one or more security and/or authorization keys. For example, the authorization key may access a gate associated with the user's apartment complex. As such, when the user crosses the threshold associated with the apartment the system may transmit the authorization key to the apartment complex and the gate may be opened in response.

Any of the features described herein with respect to a particular process flow are also applicable to any other process flow. In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. An apparatus for providing a geolocation check-in system, the apparatus comprising:
   a memory;
   one or more processors; and
   a module stored in the memory, executable by the one or more processors, and configured to cause the one or more processors to:
   monitor a web-based social network and obtain social network data associated with the user, wherein the social network data provides an indication of a likely route of travel of the user;
   determine, based on the obtained social network data, the likely route of travel of the user;
   identify a threshold of a geofence associated with a merchant's location through which the likely route of travel of the user will cross;
   monitor a current position of a computing device associated with the user along the likely route of travel, wherein the current position is determined by the computing device by:
   (i) interfacing with a global positioning system;
   (ii) analyzing a video stream of an environment surrounding the user captured by the computing device;
   determine, based at least partially on the current position, that the user has crossed the threshold of the geofence associated with the merchant's location;
   transmit, in response to the determination that the user has crossed the threshold, a communication to the user requesting whether the user desires to check-in with a social media site associated with the merchant;
   receive a verification that the user desires to check-in with the merchant;
   initiate, based at least partially on determining that user has crossed the threshold of the geofence, a merchant check-in with the social network associated with the merchant; and
   transmit user information associated with the user to the merchant.

2. The apparatus of claim 1, wherein determining that the user has crossed the threshold of the geofence further comprises the apparatus being configured to compare the user's current position to the threshold of the geofence.

3. The apparatus of claim 1, wherein the apparatus is further configured to receive one or more user preferences for processing check-ins with a social network associated with a merchant.

4. The apparatus of claim 1, wherein initiating the check-in with the social network associated with the merchant further comprises prompting the user to accept one or more terms and conditions associated with the merchant.

5. The apparatus of claim 1, wherein the apparatus is further configured to store the user information.

6. The apparatus of claim 1, wherein the apparatus is further configured to notify one or more entities of a successful check-in.

7. A method for providing a geolocation check-in system, the method comprising:
- monitoring, by one or more processors, a web-based social network and obtain social network data associated with the user, wherein the social network data provides an indication of a likely route of travel of the user;
- determining, by the one or more processors based on the obtained social network data, the likely route of travel of a user;
- identifying, by the one or more processors, a threshold of a geofence associated with a merchant's location through which the likely route of travel of the user will cross;
- monitoring, by the one or more processors, a current position of a computing device associated with the user along the likely route of travel, wherein the current position is determined by the computing device by:
  - (i) interfacing with a global positioning system; and,
  - (ii) analyzing a video stream of an environment surrounding the user captured by the computing device;
- determining, by the one or more processors based at least partially on the current position, that the user has crossed the threshold of the geofence associated with the merchant's location;
- transmitting, by the processor in response to the determining, a communication to the user requesting whether the user desires to check-in with a social media site associated with the merchant;
- receiving, by the one or more processors, a verification that the user desires to check-in with the merchant;
- initiating, by the one or more processors in response to receiving the verification, a merchant check-in with the social network associated with the merchant; and
- transmitting user information associated with the user to the merchant.

8. The method of claim 7, wherein determining that the user has crossed the threshold of the geofence further comprises comparing the user's current position to the threshold of the geofence.

9. The method of claim 7, wherein the method further comprises receiving one or more user preferences for processing check-ins with a social network associated with a merchant.

10. The method of claim 7, wherein initiating the check-in with the social network associated with the merchant further comprises prompting the user to accept one or more terms and conditions associated with the merchant.

11. The method of claim 7, wherein the method further comprises storing the user information.

12. The method of claim 7, wherein the method further comprises notifying one or more entities of a successful check-in.

13. A computer program product for providing a geolocation check-in system, the computer program product comprising:
- a non-transitory computer-readable medium comprising a set of codes for causing a computer to:
- monitor a web-based social network and obtain social network data associated with the user, wherein the social network data provides an indication of a likely route of travel of the user;
- determine, based on the obtained social network data, the likely route of travel of the user;
- identify a threshold of a geofence associated with a merchant's location through which the likely route of travel of the user will cross;
- monitor a current position of a computing device associated with the user along the likely route of travel, wherein the current position is determined by the computing device by:
  - (i) interfacing with a global positioning system;
  - (ii) analyzing a video stream of an environment surrounding the user captured by the computing device;
- determine, based at least partially on the current position, that the user has crossed the threshold of the geofence associated with the merchant's location;
- transmit, in response to the determination that the user has crossed the threshold, a communication to the user requesting whether the user desires to check-in with a social media site associated with the merchant;
- receive a verification that the user desires to check-in with the merchant;
- initiate, based at least partially on determining that user has crossed the threshold of the geofence, a merchant check-in with the social network associated with the merchant; and
- transmit user information associated with the user to the merchant.

* * * * *